(12) United States Patent
Bender

(10) Patent No.: US 6,253,085 B1
(45) Date of Patent: Jun. 26, 2001

(54) FORWARD POWER GAIN ADJUSTMENT DURING A SOFT HANDOFF OPERATION

(75) Inventor: Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/321,349

(22) Filed: May 27, 1999

(51) Int. Cl.$^7$ .................................................. H04Q 7/20
(52) U.S. Cl. ........................... 455/442; 455/69; 455/436; 455/522; 370/331
(58) Field of Search .................................. 455/414, 442, 455/421, 422, 424, 425, 432, 436, 437, 439, 38.3, 501, 502, 511, 522, 525, 63, 69; 370/320, 324, 331, 332, 333, 335

(56) References Cited

U.S. PATENT DOCUMENTS

| | | | |
|---|---|---|---|
| 5,703,902 | * 12/1997 | Ziv et al. | 375/200 |
| 5,862,453 | * 1/1999 | Love et al. | 455/69 |
| 5,982,760 | * 11/1999 | Chen | 370/335 |
| 6,075,974 | * 6/2000 | Saints et al. | 455/69 |

* cited by examiner

*Primary Examiner*—William G. Trost
*Assistant Examiner*—Conguan Tran
(74) *Attorney, Agent, or Firm*—Philip R. Wadsworth; Charles D. Brown; Raymond B. Hom

(57) ABSTRACT

Forward power control for a mobile communication system is provided on a frame by frame basis during a soft handoff of a mobile station from a source base station to a target base station. Each base station runs independent but identical algorithms. A selector runs the same power control algorithm as each base station and coordinates power control between the two base stations and the mobile station during the soft hand-off. The results of the algorithm run by the selector are delayed because of back haul. The selector provides the base stations with traffic gain and frame delay information corresponding to the traffic gain. The base station ASIC, modifies the base station power output according to the SNR data received from the mobile station and the traffic gain and frame delay information received from the selector. Providing the frame delay information permits forward power control even when there is delay from when the selector computes the traffic gain and the traffic gain is programmed into the base station application specific integrated circuit.

10 Claims, 4 Drawing Sheets

FORWARD POWER GAIN ADJUSTMENT DURING A SOFT HANDOFF OPERATION

BACKGROUND OF THE INVENTION

I. Field of the Invention

The present invention relates generally to forward power control in a code division multiple access ("CDMA") mobile communications system and particularly to power control using the forward channel in a CDMA system.

II. Description of the Related Art

CDMA modulation for utilizing the RF spectrum for mobile communications is one of several techniques in which a communication system serves a large number of users. CDMA technology improves the quality of service by providing robust operation in fading environments and transparent or "soft" handoffs. A soft handoff occurs when a mobile station establishes a connection to a target base station, while briefly maintaining the connection with a source base station and on occasion a third base station. As the mobile moves from its current cell (source cell) to the next cell (target cell), a traffic channel connection is simultaneously maintained with both cells.

A smooth soft handoff is accomplished by the aid of the mobile station. FIG. 1 illustrates the forward link in a soft handoff and FIG. 2 illustrates the reverse link. On the forward link, the mobile 10 uses a rake receiver (not shown) to demodulate two separate signals from two different base stations 12, 14. The two signals are combined to yield a composite signal of better quality. On the reverse link in FIG. 2, the mobile's 10 transmit is received by both base stations 12, 14. The two cells demodulate the signal separately and send the demodulated frames back to the base station controller 16. The base station controller ("BSC") 16 contains a selector 18 that selects the best frame out of the two that are sent back.

The CDMA system accomplishes smooth operation by strict power control. Because all users share the same RF band through the use of PN codes, each user looks like random noise to other users. The power of each individual user must be carefully controlled such that no one user is unnecessarily interfering with others who are sharing the same band. This is also true during soft handoffs, where the mobile station transmits on the reverse link a power control message to the base station. The IS-95 standard specified that the mobile must report back to the base station the quality, related to the signal-to-noise ratio ("SNR"), of the forward link. The mobile station gathers statistics on error performance on whether it is decoding the base station signals correctly and informs the base station via a power control message. The base station then adjusts its power to the specific user accordingly. Symbols transmitted on the forward and reverse channels are formatted into frames, each frame having a 20 millisecond length. U.S. Pat. No. 5,504,773, entitled "METHOD AND APPARATUS FOR THE FORMATTING OF DATA FOR TRANSMISSION" issued Apr. 2, 1996 of Padovani et al., and assigned to the assignee of the present invention, recites a more detailed explanation of these frames.

The mobile station updates the power control on a frame by frame basis. The high update rate of power control messages enable the base stations to fine tune their transmit power to each individual mobile station, keeping their transmit power at the minimum level required to maintain a link, thus minimizing the total interference of the system and improving the capacity of the system. The frame by frame power control process is disclosed in U.S. Pat.No. 5,383, 219, entitled "FAST FORWARD LINK POWER CONTROL IN A CODE DIVISION MULTIPLE ACCESS SYSTEM" issued to Wheatly HI, et al., and assigned to the assignee of the present invention, the disclosure of which is hereby incorporated by reference as if fully set forth herein.

A selector is responsible for base station processing requirements. The selector of the land network determines a traffic rate at which a frame is sent to a mobile station and sends the frame to all base stations communicating with that particular mobile. The number of bits per frame transmitted on the reverse channel varies according to the traffic rate. A more detailed description of the traffic rate will be provided below.

During a soft handoff, a plurality of base stations transmit the frame to the mobile. After combining data from possible multiple base stations, the mobile determines whether the last frame has been received and decoded correctly. If the mobile correctly decoded the last frame, the mobile sets the power control bit in the next frame that is transmitted to the base stations. The selector monitors and synchronizes communication when multiple base stations simultaneously communicate with a mobile station. Since the selector knows the rate at which the base stations transmitted the last frame to the mobile and now has feedback from the mobile on whether that frame was correctly decoded, the selector compiles a table of statistics on the error rates that the mobile station is incurring at each rate. As an example, for a given traffic rate, the selector calculates an error rate of "E1."

The selector determines the power level or traffic gain at which the next frame is to be transmitted by comparing to zero the respective difference just calculated. For example, if the frame is to be transmitted at a full rate and E1>0, the power level will be $P_{nominal}+P$, where P is a function of the value of E1 and $P_{nominal}$ is the power level set by the carrier for that geographical area. If E1=0, the power level will be $P_{nominal}$. If E1<0, the power level is $P_{nominal}-P$. The selector forwards the next frame to be transmitted to the mobile to the base stations that are communicating with the mobile. An indication of the power level at which the frame is to be transmitted is included with this frame.

The problem with the type of power control described above is that there is delay between the time the selector calculates the traffic gain, and when the traffic gain is transmitted to the base stations and programmed into the application specific integrated circuit ("ASIC"). Each base station and the selector run identical power control algorithms, but the result of the selector algorithm is delayed due to back haul.

During a soft handoff operation one of the base stations communicating with the mobile station may receive an erroneous SNR signal from the mobile, or may receive no command signal from the mobile station. Because power control signals on the forward channel are transmitted at a high rate, the base station may transmit at an undesirably high or low power level for several frames prior to receiving the most reliable traffic gain from the selector. If the base station transmits at a power level too high, the overall interference of the system is increased. If the base station transmits at a power level too low, then communication quality is degraded.

SUMMARY OF THE INVENTION

There is a resulting need for a process by which the selector provides the base stations with the traffic gain and frame delay information corresponding to that gain, so as to compensate for the delay due to back haul.

It is an object of the present invention to provide an arrangement in which the power control algorithm run by the selector determines and transmits the most reliable traffic gain for each base station during a soft handoff operation. In addition, the selector sends each base station frame delay information corresponding to the traffic gain. The mobile station measures and sends signal-to-noise ratio information rather than error rate information. The base station ASIC, modifies the base station power output according to the SNR data received from the mobile station and the traffic gain and frame delay information received from the selector. Both base stations simultaneously run the power control algorithm. When the correct gain commands sent from the selector to one of the base stations are delayed, the soft handoff may become noisy or disrupted. In such a case, the DSP inserts the correct gain into a previous frame chosen according to the delay information, and re-applies all corrections thereafter, and thus resynchronizes the gain information from the selector to both base stations.

This invention utilizes the sliding window buffer to listen for the power control signal. In this regard, the ASIC keeps track of adjustments when it gets correct signal information from a base station controller or selector.

DETAILED DESCRIPTION OF THE INVENTION

The symbols transmitted on the forward and reverse channels are formatted into frames, each frame having a 20 millisecond length. The amount of data transmitted in each frame depends on the data rate. Each frame contains out of bound signaling on the reverse channels. In forward power control, the mobile sends the desired change in forward SNR, out of band on the reverse channel.

Figure 1:
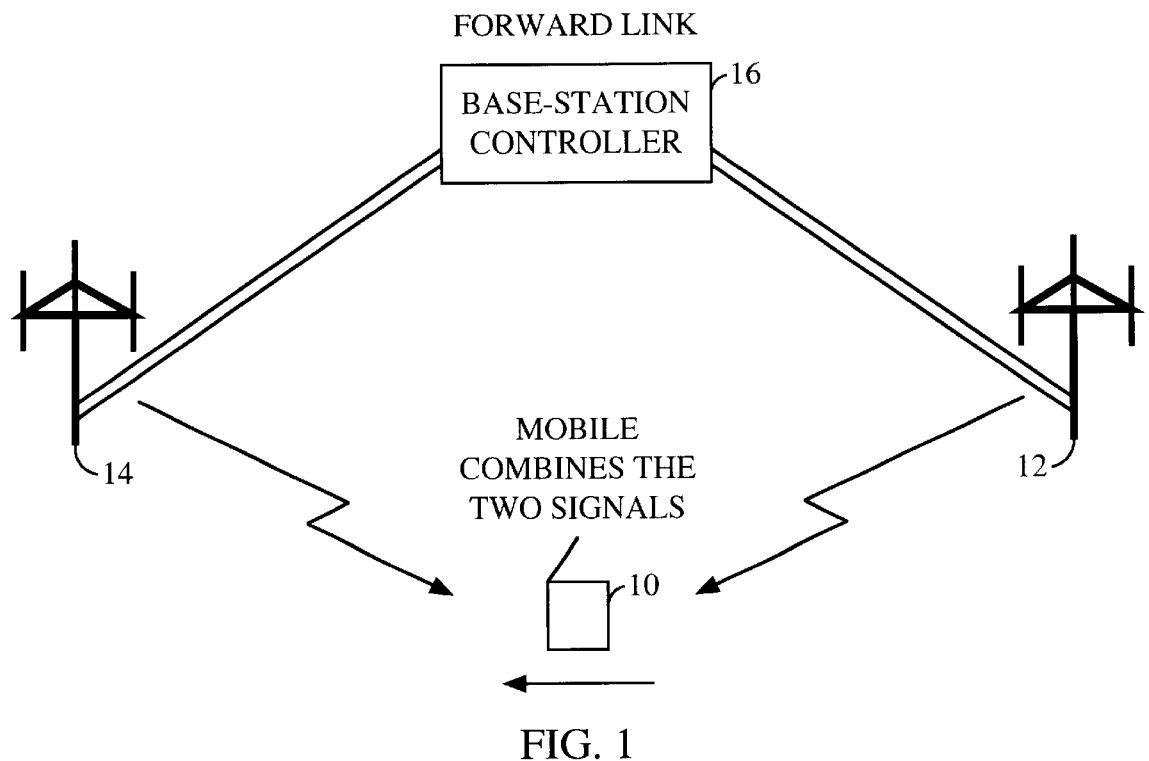
FIG. 1 shows a forward link for a mobile station, a source base station and target base station during a soft handoff operation.
Figure 2:
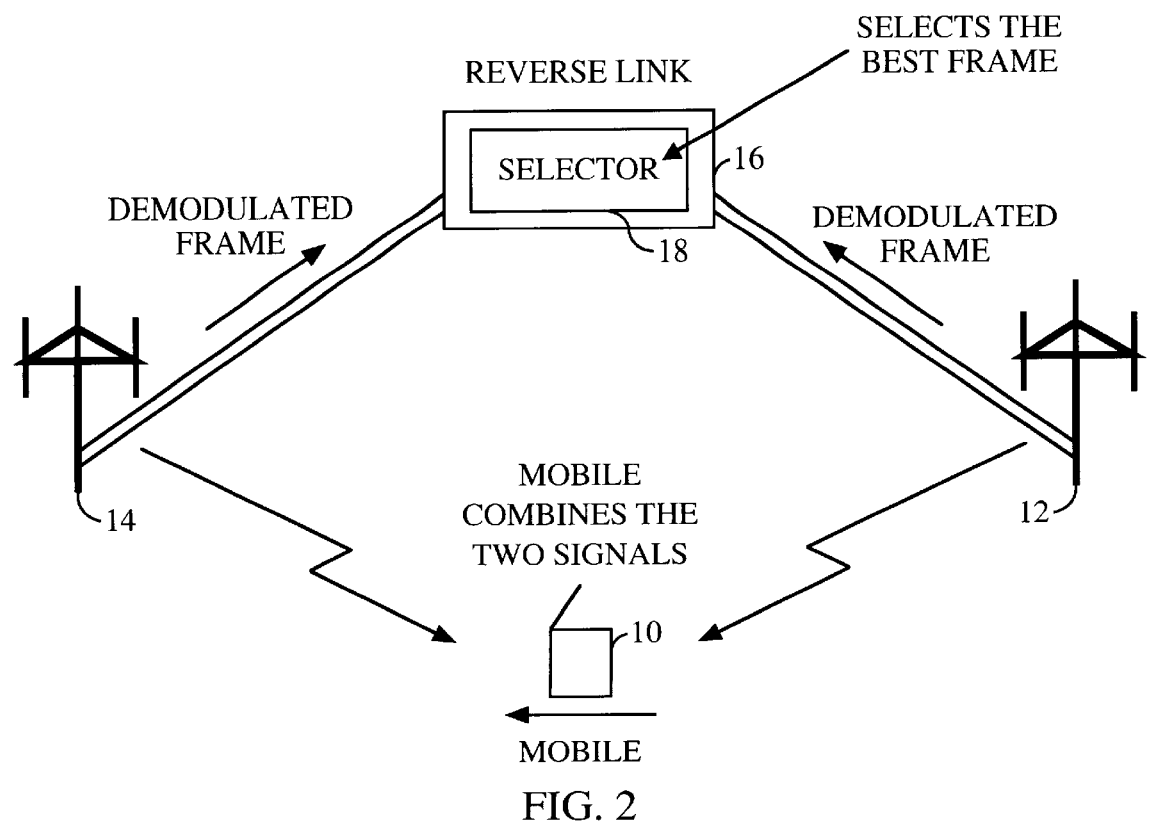
FIG. 2 shows a reverse link for a mobile station, source base station and target base station during a soft handoff operation.
Figure 3:
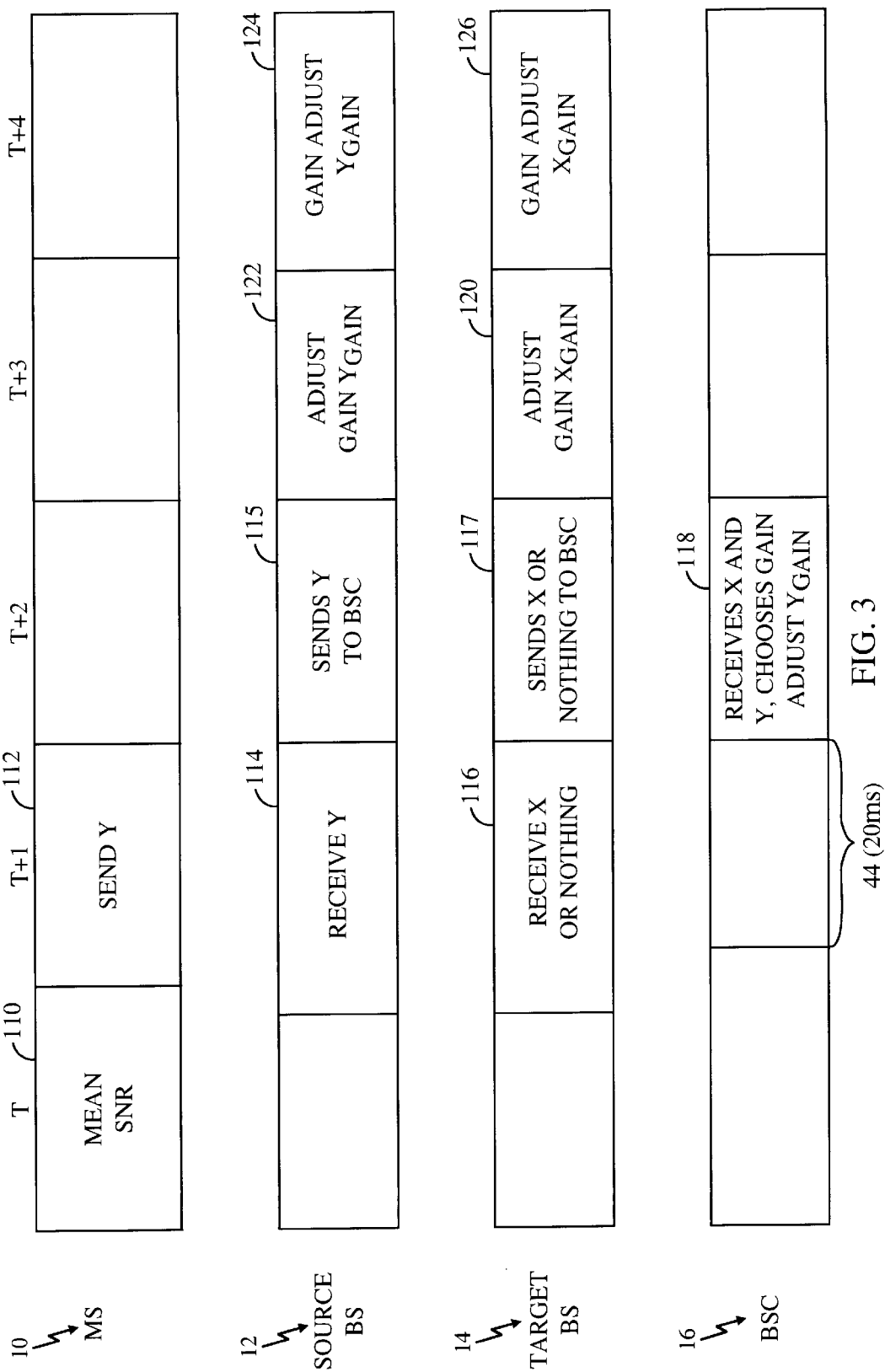
FIG. 3 is a timing chart showing exemplary timings power control signals in traffic channels received and transmitted between the mobile station, base stations, and base station controller, during a soft handoff operation in the CDMA communication system of FIG. 4.

FIG. 3 illustrates the frame by frame signal processing of the SNR signals and power control signals between the mobile station 10, the base stations 12, 14, and the base station controller 16 or selector 18 during a soft handoff operation. Each time period T, T+1, etc., represents a frame of information transmitted. It is noted that although the SNR signal in the following example is transmitted once per frame, the SNR updates over the airwaves from the mobile station may be sent more often than once per frame, and more often than the updates between the base station controller 16 and the selector 18. What follows is an example of a scenario in which the present invention is applicable.

At time T, the mobile station 10 determines the mean SNR 110 of the forward channel gain. At time T+1, the mobile station 10 transmits 112 a delta SNR signal Y corresponding the difference between forward channel SNR and the desired forward channel SNR to both base stations 12, 14. The delta SNR signal instructs the base stations that they should be transmitting at a gain $Y_{gain}$ for optimal power control for the mobile station. Also at time T+1, the source base station 12 receives delta SNR signal Y 114. However, suppose the target station 14 receives an erroneous delta SNR signal X or receives no signal 116. At time T+2, the base station controller 16 receives delta SNR signal Y 118 sent 115 from the source base station 12 and error signal X 118 sent 117 from the target base station 14. The selector 18 (not shown in FIG. 4) or base station controller 16 receives both gain values and determines the gain value at which each base station should be transmitting. Suppose in this example that the optimal gain corresponds to the received delta SNR signal is $Y_{gain}$. The selector 18 then transmits a command $Y_{command}$ to each base station instructing the base station to transmit at a traffic gain $Y_{gain}$ 118. By the time T+2, the source base station 12 has adjusted its traffic gain to $Y_{gain}$ 122, and the target base station 14 has adjusted its power gain to $X_{gain}$ 120. At time T+4, the base stations 12, 14 have received the traffic gain control signal $Y_{command}$ 122 from the base station controller 16 and each transmits at a power level of $Y_{gain}$ 124, 126. However, due to back haul one of the base stations 12, 14 may receive the new gain information later than the other. Because both base stations are simultaneously running the same power control algorithm, gain instructions become unsynchronized on a frame by frame basis. To avoid the base stations becoming unsynchronized and transmitting at inconsistent power levels, frame delay information is also included with the gain information.

The base stations 12, 14 will utilize the frame delay information and gain information and set the gain at time T+2 to $Y_{gain}$. Using the frame delay information, the base stations 12, 14 re-apply all the corrections between time T+2 forward. In this manner, each base station 12, 14 is resynchronized with the appropriate gain. Therefore, the same frame of information sent and received from the mobile station 10 to each base station 12, 14 properly correspond and no disruption occurs during soft handoff.

It is noted that in this illustrative example, frame timing is not strict. For example, the base station controller 16 may receive error signal Y 114 from source base station 12 at a time—or more than one frame—later than T+3. Similarly, the base stations 12, 14 may receive the traffic gain control signal 120, 122 from the base station controller and transmit at a power level of $Y_{gain}$ 124, 126 at a time or more than one frame later than T+4.

Figure 5:
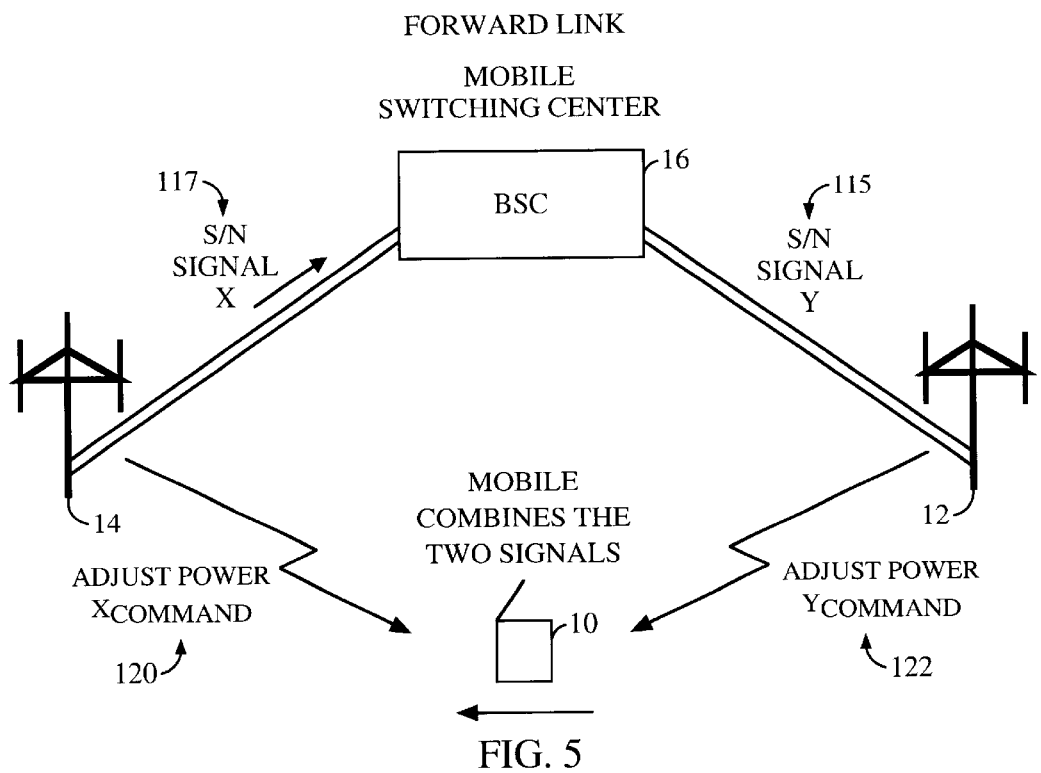
FIG. 5 illustrates forward link power control signals during a soft handoff operation.
Figure 4:
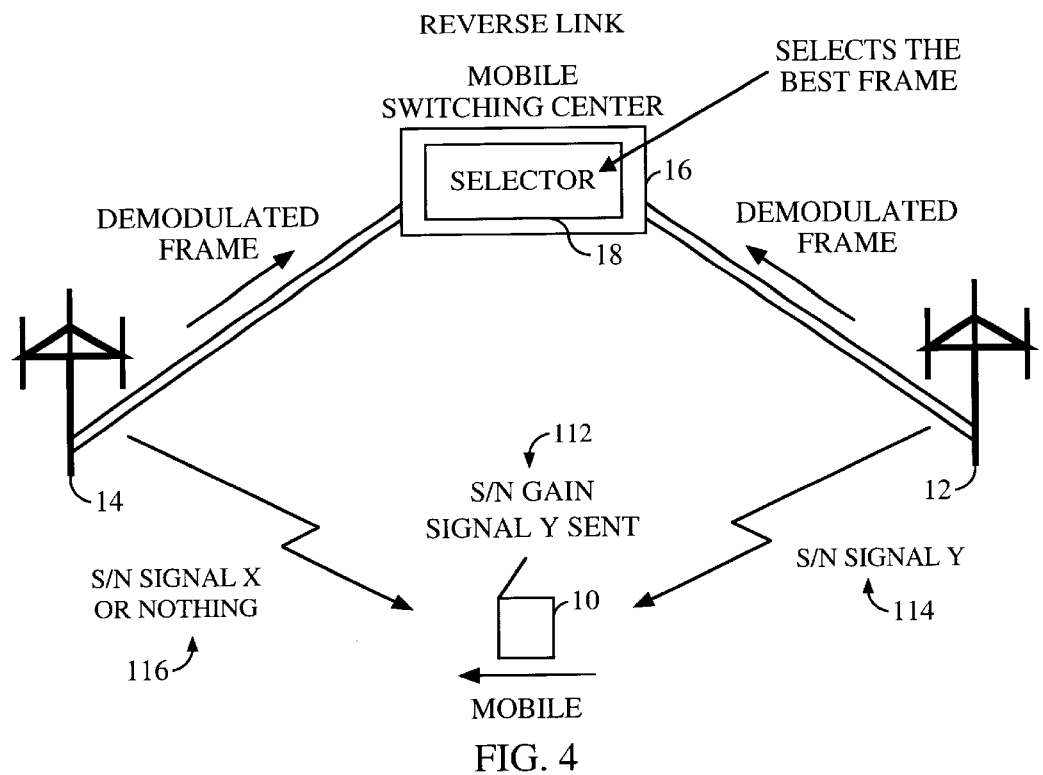
FIG. 4 illustrates the reverse link path in the CDMA architecture showing communication between a mobile station, source and target base stations, and the selector during a soft handoff operation.
Figure 6:
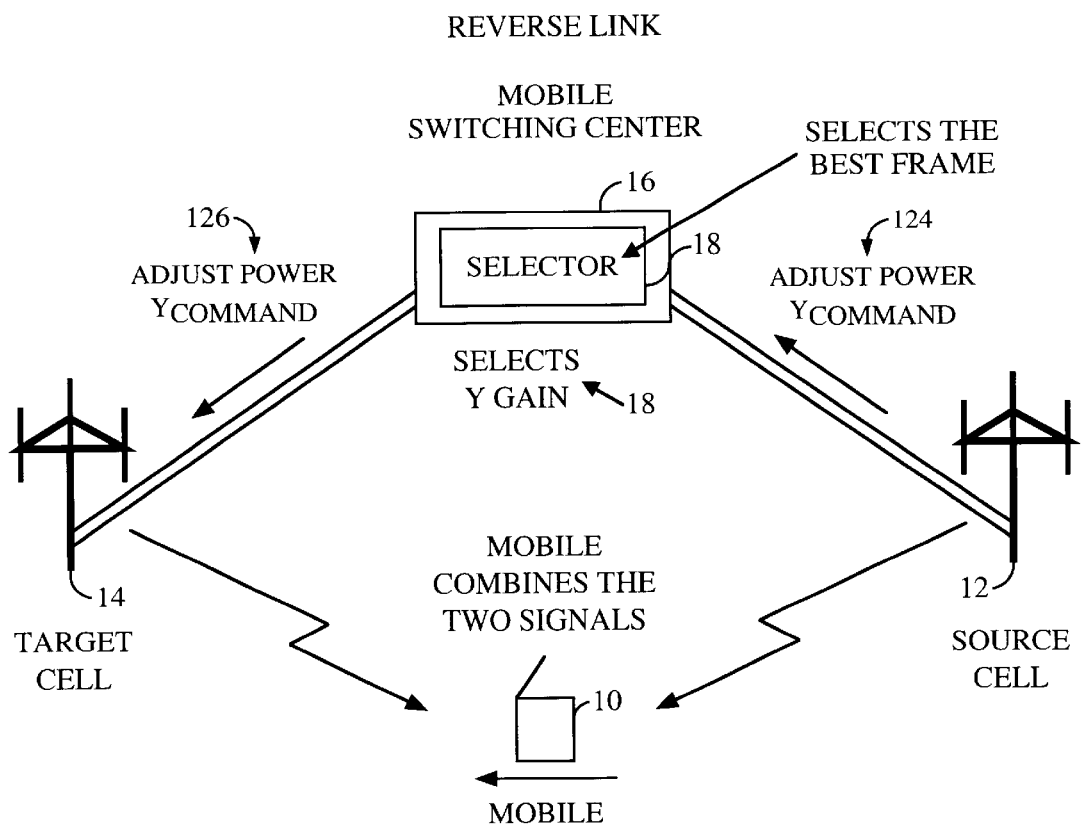
FIG. 6 shows the reverse link after the selector has selected a power gain for the base stations.

FIGS. 4–6 illustrate the scenario when inconsistent power control signals are received at the source base station 12 and the target base station 14. Continuing the previous example, suppose the mobile station 10 sends a SNR signal Y 114 to the source base station 12. The source base station 12 responds by adjusting its transmit power to $Y_{gain}$ 122. The mobile station 10 also transmits a SNR signal Y 112 to target base station 14. Suppose the target base station receives the SNR signal as X 116 or perhaps does not receive any error signal. The target base station 14 responds by adjusting its transmit power to $X_{gain}$ 120.

During the soft handoff, the base station controller 16 or selector 18 synchronizes the control of the source base station 12 and the target base station 14. To accomplish this control, the source base station 12 forwards the SNR signal Y 115, and the target base station 14 forwards its received SNR signal X 117 to the selector 18. The selector 18 transmits to the source base station 12 and the target base station 14 the chosen power transmission level $Y_{gain}$ corresponding to the most reliable SNR signal. In this example, the selector determines that the SNR signal Y is more reliable, and thus sends a command signal $Y_{command}$ 124, 126 to instruct each base station 12, 14 to transmit at a traffic gain of $Y_{gain}$. When one base station receives the gain adjustment one or more frames later than the other base station, a frame signal is also included. Frame delay is determined either statistically or by using a message time stamp. (not shown.) The base station ASIC resets the power transmission level at the appropriate time, or in the appropriate frame, and reapplies corrected gain signals in each frame following the first corrected frame. The base stations thus transmit at the same power $Y_{gain}$ to the mobile station 10 and the ASIC of the respective base stations are synchronized.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principals and novel features disclosed herein. The scope of the invention should be determined by the appended claims and their legal equivalents, rather than by the examples given.

What is claimed is:

1. A mobile communication system having frame-by-frame power control comprising:
   a mobile station;
   a plurality of base stations;
   a selector capable of controlling and synchronizing communication between said plurality of base stations and said mobile station;
   said mobile station being adapted to transmit a signal-to-noise-ratio signal based on a forward channel signal power level to said plurality of base stations via a reverse link, each of said base stations capable of transmitting said signal-to-noise-ratio signal to said selector;
   said selector being adapted to transmit a transmission gain command corresponding to said signal-to-noise-ratio and a frame delay information signal to each of said base stations;
   each of said base stations being adapted to adjust a transmission power level according to said gain command, wherein each base station transmits communication signals to said mobile station at a desired power level in synchronized frames; and
   each of said base stations utilizes said frame delay information for adjusting base station transmission power level and inserts a corrected transmission power level into at least one previous frame and to re-apply any erroneous transmission power levels in frames subsequent to said at least one previous frame.

2. A mobile communication system as in any one of claim 1 wherein said signal-to-noise-ratio signal is transmitted out of band.

3. A mobile communication system having frame-by-frame power control comprising:
   a mobile station;
   a source base station;
   a target base station;
   a selector capable of controlling and synchronizing communication between said source base station, said target base station, and said mobile station;
   said mobile station being adapted to transmit a signal-to-noise-ratio signal based on a forward channel signal power level to said plurality of base stations via a reverse link, to said source base station and said target base station, said source base station and said target base station each being adapted to adjust power transmission level according to said signal-to-noise-ratio signal, said source base station and said target station capable of transmitting said signal-to-noise-ratio signal to said selector;
   said selector being adapted to transmit a transmission gain command corresponding to said signal-to-noise-ratio and a frame delay information signal to said source base station and said target base station; said source base station and said target base station each being adapted to adjust transmission power level according to said transmission gain command, wherein each of said source and target base stations transmits communication signals to said mobile station at a desired power level in synchronized frames; and
   said source base station and said target base station utilize said frame delay information for adjusting transmission power level and insert a corrected transmission power level into at least one previous frame and to re-apply any erroneous transmission power levels frames subsequent to said at least one previous frame.

4. The mobile communication system of claim 3, wherein said mobile station communicating with said source base station may transfer from communicating with said source station to said target station with minimum disruption in signal quality.

5. A mobile communication system having frame-by-frame power control comprising:
   a mobile station;
   a source base station;
   a target base station;
   a selector capable of controlling and synchronizing communication between said source base station, said target base station, and said mobile station;
   said mobile station, while simultaneously communicating with said source base station and said target base station, being adapted to calculate a mean signal-to-noise-ratio based on received communication signals on a forward channel from said target and said source base stations, said mobile station being adapted to transmit said mean signal-to-noise-ratio signal on a reverse link to said source base station and said target base station;
   said source base station and said target base station being adapted to adjust power transmission level according to said mean signal-to-noise-ratio signal, said source base station and said target station being adapted to transmit said signal-to-noise-ratio signal to said selector;
   said selector being capable of transmitting a transmission gain command corresponding to said mean signal-to-noise-ratio and a frame delay information signal to said source base station and said target base station; said source base station and said target base station being adapted to adjust transmission power level according to said transmission gain command, wherein each of said source and target base stations transmits communication signals to said mobile station at a desired power level in synchronized frames; and said source base station and said target base station are adapted to utilize said frame delay information for adjusting base station transmission power level and to insert a corrected transmission power level into at least one previous frame and to re-apply any erroneous transmission power levels in frames subsequent to said at least one previous frame, wherein said mobile station communicating with said source base station may transfer from communicating with said source station to said target station with minimum disruption in signal quality.

6. A method for providing frame by frame data communication in a mobile communication system having a plurality of base stations, a selector, and a mobile station, said method comprising:

receiving communication signals at said mobile station from more than one of said plurality of base stations via a forward channel;

transmitting forward channel signal-to-noise-ratio information via a reverse link from said mobile station to more than one of said plurality of base stations, said signal-to-noise-ratio information corresponding to a mean signal-to-noise-ratio power level received from said plurality of base stations which are simultaneously communicating with said mobile station;

transmitting said signal-to-noise information from each base station to said selector;

determining in said selector, based on said forward channel signal-to-noise information, a desired station transmission power level;

providing each base station with said desired transmission power level and a frame delay corresponding to said desired transmission power level; and adjusting base station transmission power level in subsequent frames according to said desired transmission power level and corresponding frame delay, wherein adjusting said desired transmission power level comprises correcting a transmission power level in a previous frame according to said frame delay and reapplying correct power levels in all frames subsequent to said previous frame, wherein transmission power levels for said plurality of base stations simultaneously communicating with said mobile station will be synchronized.

7. The method for providing data communication according to claim 6, wherein said method is executed during a soft hand-off operation.

8. A method for adjusting a traffic channel transmission power level in a communication system having a first and second base station, a selector, and a mobile station, said method comprising the steps of:

receiving communication signals at said mobile station from said first and second base stations;

calculating a mean signal-to-noise-ratio signal from said communication signals received from said first and second base stations, respectively;

transmitting said mean signal-to-noise-ratio signal to each of said first and second base stations, wherein each base station forwards its received mean signal-to-noise-ratio signal to said selector;

determining at the selector between the two received mean signal-to-noise-ratio signals from each base station, a most reliable mean signal-to-noise-ratio signals and calculating a desired base station transmission power level;

providing the first and second base stations with said most reliable transmission power level;

adjusting each base station traffic transmission power level according to said most reliable transmission power level received at said selector; and providing frame delay information from said selector when said most reliable power transmission level being transmitted to a base station is delayed, wherein adjusting said base station traffic power transmission level comprises correcting a previous power transmission level in a previous frame according to said frame delay and reapplying correct power transmission levels in all frames following said previous frame.

9. The method of claim 8, wherein the steps are executed during a soft hand-off operation.

10. In a system having a plurality of base stations and at least one selector, said base stations capable of bi-directional communication with a mobile unit wherein information is communicated to said mobile unit from said plurality of base stations on a forward link and information is communicated to said plurality of base stations from said mobile unit on a reverse link, a method of controlling base station gain comprising the steps of:

transmitting from the mobile unit to each base station forward link signal-to-noise data;

determining from said forward link signal-to-noise data received from each base station an improved power transmission level for each base station;

providing each base station the improved power transmission level and a frame delay corresponding to the improved power transmission level;

adjusting base station power transmission level in subsequent frames using the improved power transmission level and corresponding frame delay;

providing frame delay information from said selector when said most reliable power transmission level being transmitted to a base station is delayed, wherein adjusting said base station traffic power transmission level comprises correcting a previous power transmission level in a previous frame according to said frame delay and reapplying correct power transmission levels in all frames following said previous frame.

* * * * *